United States Patent
Manabe

(10) Patent No.: US 10,560,631 B2
(45) Date of Patent: Feb. 11, 2020

(54) MOTION VECTOR ACQUIRING DEVICE, MOTION VECTOR ACQUIRING METHOD, AND STORAGE MEDIUM

(71) Applicant: CASIO COMPUTER CO., LTD., Shibuya-ku, Tokyo (JP)

(72) Inventor: Yoshitsugu Manabe, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/926,464

(22) Filed: Mar. 20, 2018

(65) Prior Publication Data
US 2018/0278846 A1  Sep. 27, 2018

(30) Foreign Application Priority Data
Mar. 24, 2017 (JP) .................. 2017-059145

(51) Int. Cl.
*H04N 5/232* (2006.01)
*G06T 7/246* (2017.01)

(52) U.S. Cl.
CPC ......... *H04N 5/23251* (2013.01); *G06T 7/246* (2017.01); *H04N 5/23203* (2013.01); *H04N 5/23267* (2013.01)

(58) Field of Classification Search
CPC ........... H04N 5/23251; H04N 5/23267; H04N 5/23203; G06T 7/246; G06T 2207/10016
See application file for complete search history.

(56) References Cited

U.S. PATENT DOCUMENTS

| 7,015,952 B2 | 3/2006 | Okada | |
| 7,468,743 B2* | 12/2008 | Washisu | H04N 5/23248 348/208.1 |
| 8,350,916 B2* | 1/2013 | Ohmiya | G03B 5/00 348/208.4 |

(Continued)

FOREIGN PATENT DOCUMENTS

| JP | 2002112252 A | 4/2002 |
| JP | 2003134385 A | 5/2003 |

(Continued)

OTHER PUBLICATIONS

Japanese Office Action dated Nov. 29, 2019 (and English translation thereof) issued in Japanese Patent Application No. 2017-059145.

*Primary Examiner* — Padma Haliyur
(74) *Attorney, Agent, or Firm* — Holtz, Holtz & Volek PC

(57) ABSTRACT

By using various information such as GPS information, cartographic information, and atmospheric pressure acquired by a sensor, a CPU of an imaging device calculates a motion vector in a limited MV calculation area acquired by excluding from images an area where radial motion vectors occur which highly possibly give an adverse effect to motion vector calculation, in accordance with the gravity direction with respect to the imaging device, the orientation of the imaging device, and the slope angle of the road where the imaging device is moving forward. After calculating the motion vector, the CPU estimates a blur amount between frames from the calculated motion vector and, based on this blur amount, performs the alignment of a feature point between the frames by image deformation processing.

8 Claims, 9 Drawing Sheets

(56) References Cited

U.S. PATENT DOCUMENTS

| | | | |
|---|---|---|---|
| 8,497,916 B2 * | 7/2013 | Ogura | H04N 5/23267 348/208.13 |
| 9,609,355 B2 | 3/2017 | Tsubaki | |
| 2002/0036692 A1 | 3/2002 | Okada | |
| 2008/0199050 A1 | 8/2008 | Koitabashi | |
| 2018/0139368 A1 | 5/2018 | Nakayama | |

FOREIGN PATENT DOCUMENTS

| | | |
|---|---|---|
| JP | 2008203992 A | 9/2008 |
| JP | 2010104005 A | 5/2010 |
| JP | 2015019231 A | 1/2015 |
| JP | 2016046666 A | 4/2016 |
| JP | M16149711 | 8/2016 |
| JP | M17005678 | 1/2017 |

* cited by examiner

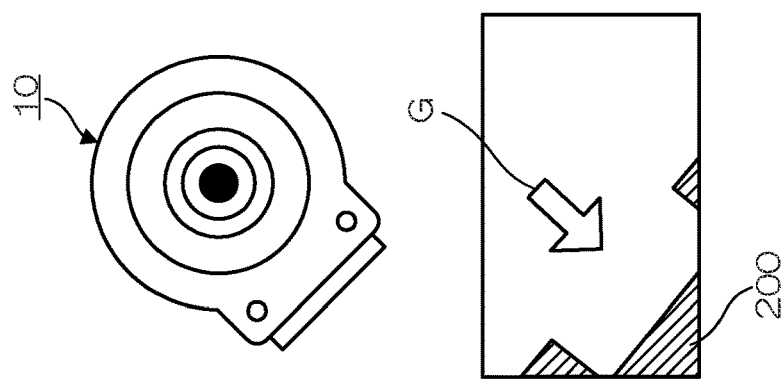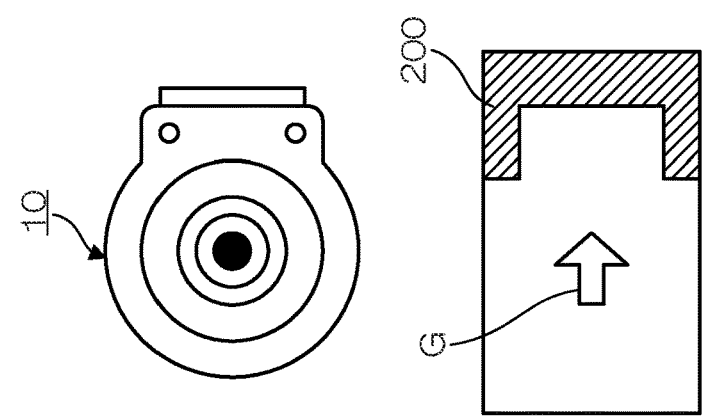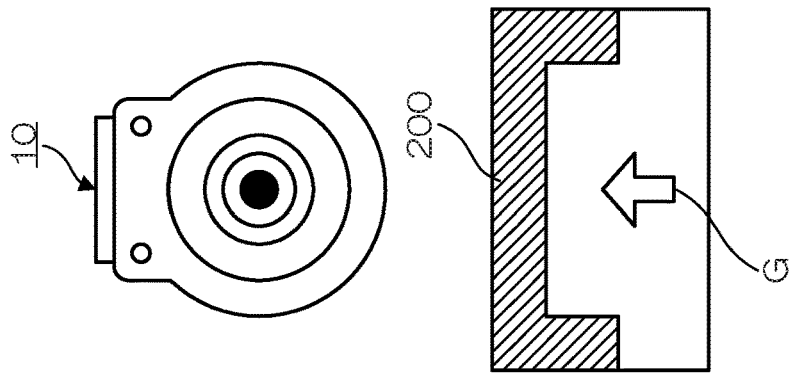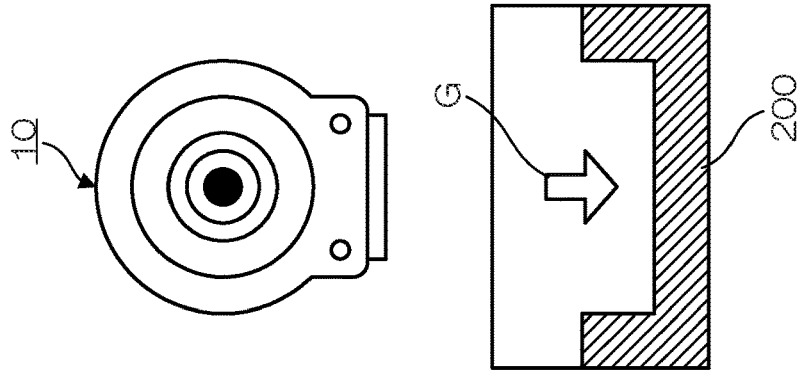

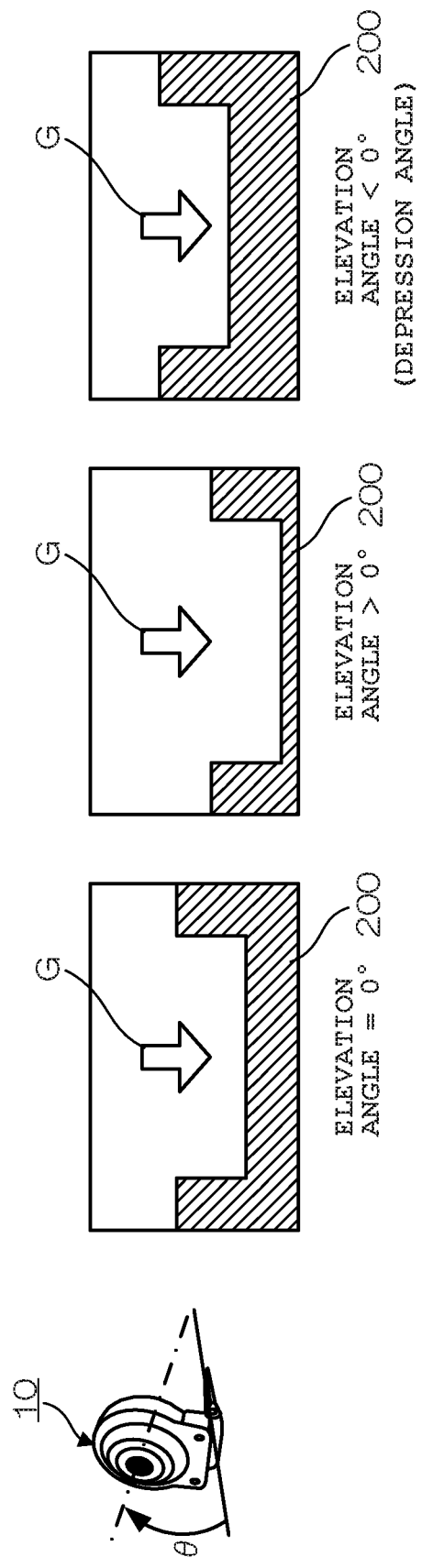

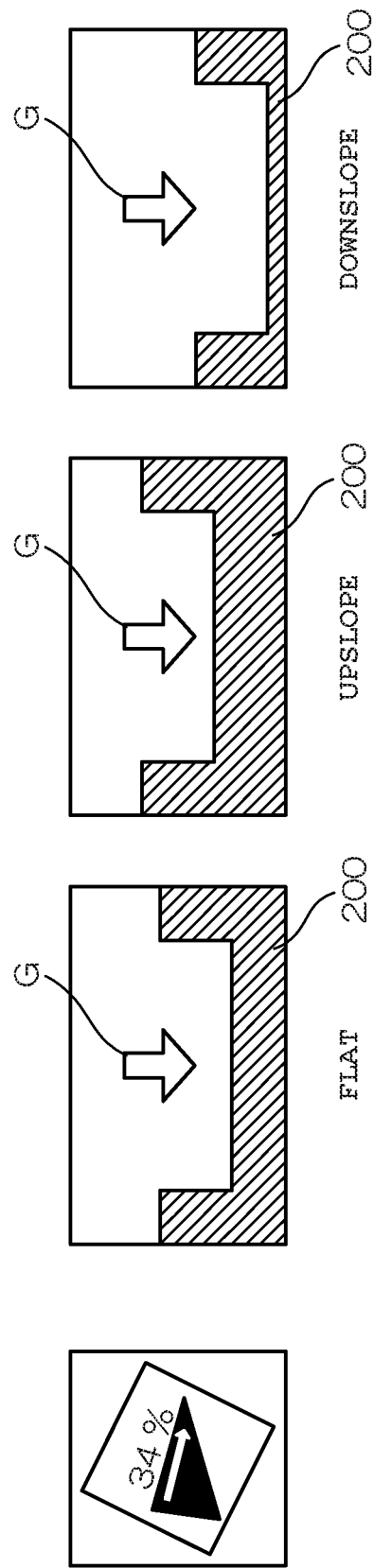

MOTION VECTOR ACQUIRING DEVICE, MOTION VECTOR ACQUIRING METHOD, AND STORAGE MEDIUM

CROSS-REFERENCE TO RELATED APPLICATION

This application is based upon and claims the benefit of priority from the prior Japanese Patent Application No. 2017-059145, filed Mar. 24, 2017, the entire contents of which are incorporated herein by reference.

BACKGROUND OF THE INVENTION

1. Field of the Invention

The present invention relates to an image processing device, an image processing method and a storage medium.

2. Description of the Related Art

An imaging method is now coming into widespread use in which an imaging device such as a digital camera is attached to the body (such as head or trunk) or clothes of a user or a bicycle, motorcycle, vehicle, or the like and automatically or remotely captures still images, moving images, etc.

In Japanese Patent Application Laid-Open (Kokai) Publication No. 2008-203992, a technique has been proposed in which an imaging device is mounted on a vehicle such that the moving direction of the vehicle and the optical axis coincide with each other, and senses rotation occurring by moving so as to detect a motion vector (MV).

SUMMARY OF THE INVENTION

In accordance with one aspect of the present invention, there is provided an image processing device comprising: a motion vector acquiring section which acquires a motion vector from images inputted by an image capture device; an orientation acquiring section which acquires an orientation of the image capture device; and a setting section which sets in the images an acquisition area of the motion vector to be acquired by the motion vector acquiring section, based on the orientation of the image capture device acquired by the orientation acquiring section.

In accordance with another aspect of the present invention, there is provided a non-transitory computer-readable storage medium having stored thereon a program that is executable by a computer to function as a motion vector acquiring section which acquires a motion vector from images inputted by an image capture device; an orientation acquiring section which acquires an orientation of the image capture device; and a setting section which sets an acquisition area of the motion vector to be acquired by the motion vector acquiring section, based on the orientation of the image capture device acquired by the orientation acquiring section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6A is a conceptual, diagram for describing the position setting of a MV calculation exception area with respect to the gravity direction for the imaging device 10 according to the present embodiment in which the gravity direction G coincides with the directly below direction of the imaging device 10;

FIG. 6B is another conceptual diagram for describing the position setting of a MV calculation exception area with respect to the gravity direction for the imaging device 10 according to the present embodiment, in which the gravity direction G coincides with the directly above direction of the imaging device 10;

FIG. 6C is still another conceptual diagram for describing the position setting of a MV calculation exception area with respect to the gravity direction for the imaging device 10 according to the present embodiment, in which the gravity direction G coincides with the right (or left) direction of the imaging device 10;

FIG. 6D is yet another conceptual diagram for describing the position setting of a MV calculation exception area with respect to the gravity direction for the imaging device 10 according to the present embodiment, in which the gravity direction G coincides with the diagonally lower left (or lower right) direction of the imaging device 10;

FIG. 7A is a conceptual diagram for describing an operation of adjusting a MV calculation exception area with respect to an elevation angle of the imaging device 10 according to the present embodiment, in which the elevation angle θ is 0° (horizontal);

FIG. 7B is a conceptual diagram for describing an operation of adjusting a MV calculation exception area with respect to an elevation angle of the imaging device 10 according to the present embodiment, in which the elevation angle θ>0°;

FIG. 7C is a conceptual diagram for describing an operation of adjusting a MV calculation exception area with respect to an elevation angle of the imaging device 10 according to the present embodiment in which the elevation angle θ<0°;

FIG. 8A a conceptual diagram for describing an operation of adjusting a MV calculation exception area with respect to a movement situation of the movable body according to the present embodiment, in which the terrain is flat;

FIG. 8B is a conceptual diagram for describing an operation of adjusting a MV calculation exception area with respect to a movement situation of the movable body according to the present embodiment, in which the terrain is upslope;

FIG. 8C a conceptual diagram for describing an operation of adjusting a MV calculation exception area with respect to a movement situation of the movable body according to the present embodiment, in which the terrain is downslope;

DETAILED DESCRIPTION OF THE PREFERRED EMBODIMENTS

Embodiments of the present invention will hereinafter be described with reference to the drawings.

A. Structure of Embodiments

Figure 1:
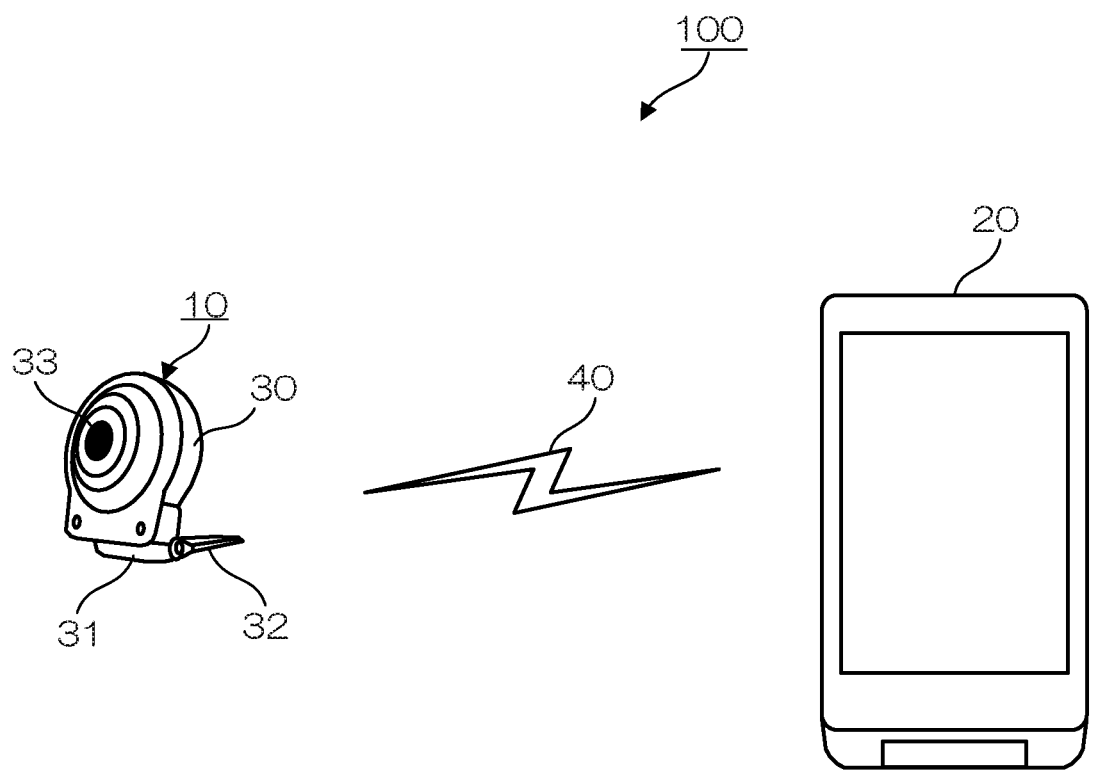
FIG. 1 is a schematic diagram showing the structure of an imaging system 100 according to an embodiment of the present invention.

FIG. 1 is a schematic diagram showing the structure of an imaging system 100 according to an embodiment of the present invention.

In FIG. 1, the imaging system 100 includes an imaging device 10 and a remote controller device 20. The imaging device 10 is constituted by, for example, a digital camera having an imaging function. The remote controller device 20 is constituted by a dedicated device, a smartphone, a tablet terminal, or the like. The imaging device 10 and the remote controller device 20 each use available wireless communication 40 to establish pairing (wireless connection recognition). This wireless communication 40 is formed of a wireless LAN (WiFi), Bluetooth (registered trademark), or the like.

The imaging device 10 is attached to the body (such as head or trunk) or clothes of a user or a movable body (not shown) such as a bicycle, motorcycle, vehicle, or the like. This imaging device 10 according to the present embodiment is constituted by a main body housing 30 accommodating main sections including an imaging section 14 and a base section 32 attached to the main body housing 30 via a hinge 31 in a manner to be fixable at any angle. The hinge 31 maintains an angle formed by the main body housing 30 and the base section 32 unless a certain level of force is applied from outside (such as by the user). When mounting the imaging device 10 on a movable body, the user fixes the base section 32 to the movable body, and adjusts the angle of the main body housing 30 with respect to the base section 32 such that a lens 33 of the main body housing 30 is oriented to a moving direction.

The remote controller device 20 remotely operates the imaging device 10 via the wireless communication 40 by using an activated application (program) dedicated for camera operation. This remote operation includes an operation of starting or stopping image capturing, an operation of setting an operation mode, an operation of zooming, an operation of setting imaging conditions, an operation of viewing captured images (captured moving images), and the like.

Figure 2:
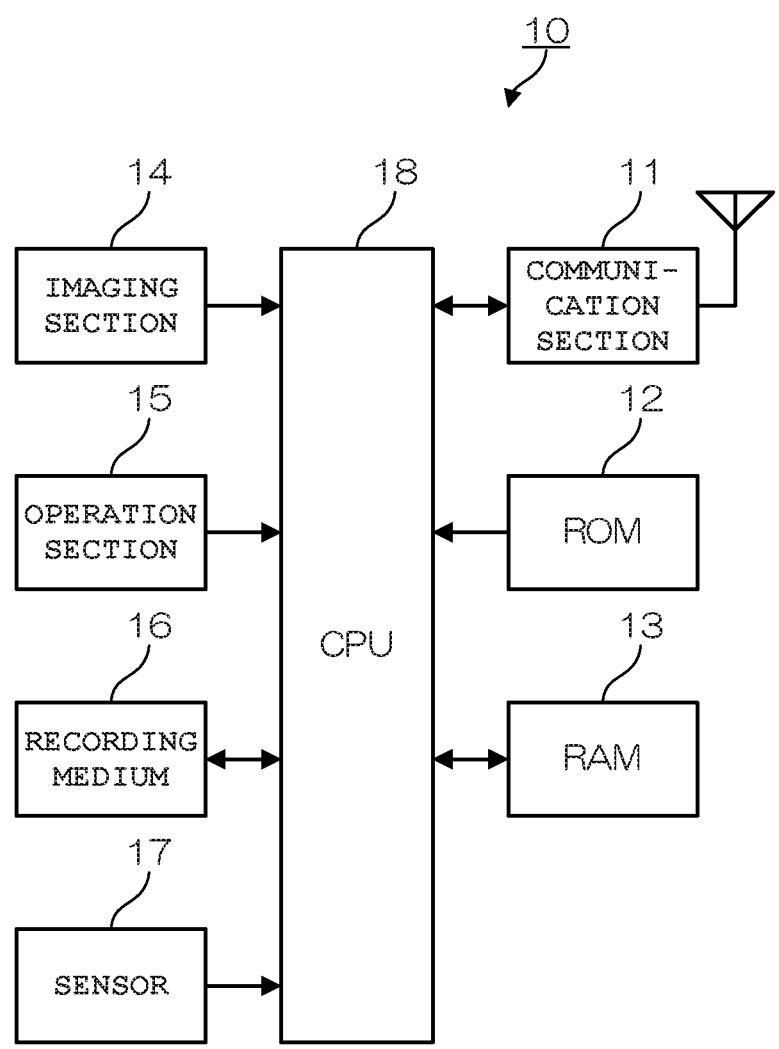
FIG. 2 is a block diagram showing the structure of an imaging device 10 according to the present embodiment.

FIG. 2 is a block diagram showing the structure of the imaging device 10 according to the present embodiment. In FIG. 2, the imaging device 10 includes a communication section 11, a ROM (Read Only Memory) 12, a RAM (Random Access Memory) 13, an imaging section 14, an operation section 15, a recording medium 16, a sensor 17, and a CPU (Central Processing Unit) 18.

The communication section 11 connects the imaging device 10 to the remote controller device 20 via the wireless communication 40 so as to transmit a live view image to the remote controller device 20 and receive an operation instruction signal from the remote controller device 20. The ROM 12 stores, for example, programs to be executed by the CPU 18 and various parameters required for operations described later. The RAM 13 is used as a buffer memory for temporarily storing image data acquired by the imaging section 14 and is also used as a working memory when the CPU 18 executes a program described later.

The imaging section 14 is a lens block formed of an optical lens group and an image sensor such as a CCD (Charge-Coupled Device) or CMOS (Complementary Metal Oxide Semiconductor), and converts an image coming from the lens block to a digital signal by the image sensor. The operation section 15 includes a power supply switch and basic operation keys such as a mode key, and outputs an operation signal in accordance with the user's key operation. The recording medium 16 stores image data acquired by the imaging section 14. The sensor 17 is constituted by at least one of a gyro sensor, acceleration sensor, geomagnetic sensor, barometric sensor, GPS, and cartographic information acquisition means, or by a combination of two or more thereof, and detects (acquires) the orientation of the imaging device 10, its image capturing situation, and the like. The orientation of the imaging device 10 includes the orientation of the imaging device 10 with respect to the gravity direction and the orientation thereof with respect to a horizontal direction. The image capturing situation includes altitude changes in a terrain where a movable body having the imaging device 10 attached thereto is moving (ascending or descending a slope).

The CPU 18 executes a program stored in the ROM 12 described above to control the operation of each section. In particular, in the present embodiment, the CPU 18 acquires a plurality of temporally-contiguous frames (images) from a live view image captured by the imaging section 14, extracts a feature point in these frames, and derives (acquires) a motion vector in accordance with the movement of the feature point between the frames.

Here, the CPU 18 judges the orientation (gravity direction (vertical direction) and elevation angle) of the imaging device 10 and its imaging situation (the movement situation of a movable body having the imaging device 10 mounted thereon: slope angle) by using various information (gyroscopic information, acceleration, geomagnetism, atmospheric pressure, GPS information, and/or cartographic information) acquired from the sensor 17. Then, based on the orientation and the imaging situation, the CPU 18 limits an area from which motion vectors MV are derived in captured images That is, based on the orientation of the imaging device 10 and the imaging situation, the CPU 18 sets the position of an area for which no motion vector MV is calculated (hereinafter referred to as a MV calculation exception area) in order to exclude an area where radial motion vectors MV may occur, and adjusts the size (area) of the MV calculation exception area.

As a result of this configuration, an adverse effect due to radial motion vectors MV can be efficiently and effectively eliminated, and a blur amount (camera shake amount) between frames can be more accurately estimated from a motion vector MV between the frames, whereby the alignment of the frames can be highly accurately performed.

Also, the CPU 18 estimates a blur amount (camera shake amount) between frames from motion vectors between the frames, and corrects the blurring by performing the alignment of the frames by image deformation processing (electronic moving image blurring correction). Note that, although a series of processing by the CPU 18 is taken as image processing in the present embodiment, a dedicated image processing section. (Graphics Processing Unit: GPU) may be provided.

Figure 3:
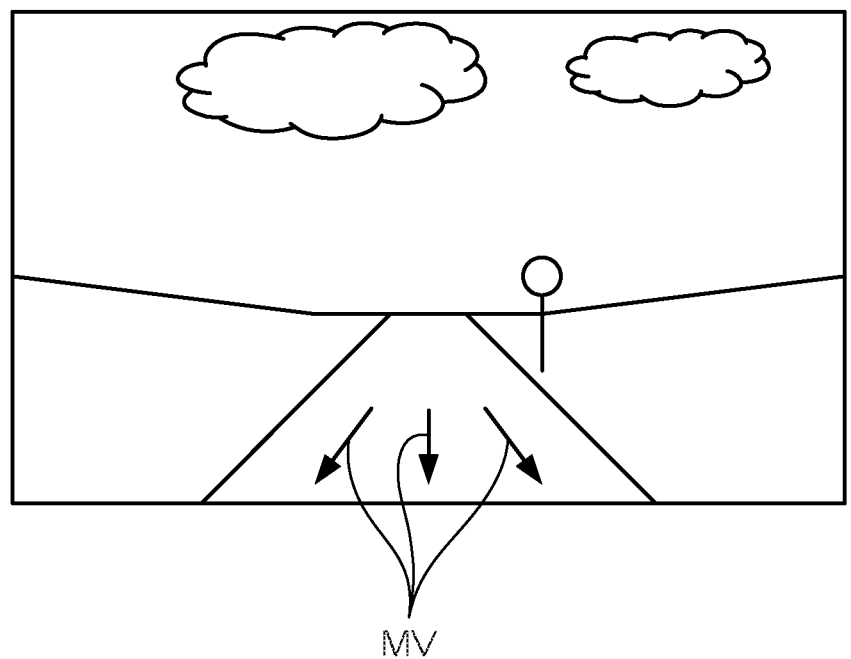
FIG. 3 is a conceptual diagram for describing an adverse effect on the estimation of a blur amount due to radial motion vectors occurring on an image periphery area in the present embodiment.

FIG. 3 is a conceptual diagram for describing an adverse effect on the estimation of a blur amount due to radial motion vectors occurring on an image periphery area in the present embodiment. In the estimation of a blur amount (camera shake amount) based on motion vectors between frames, when a user, vehicle, or the like having the imaging device 10 attached thereto is moving forward, radial motion vectors MV occur on an image periphery area, as shown in FIG. 3. These radial motion vectors MV are outputted in directions different from that of blurring and therefore adversely affects the blur amount estimation.

In the present embodiment, the CPU 18 uses various information (gyroscopic information, acceleration, geomagnetism, atmospheric pressure, GPS information, and/or cartographic information) from the sensor 17 to judge the orientation of the imaging device 10 and its imaging situation. Then, based on the judgment result the CPU 18 limits an area for which motion vectors MV are calculated (hereinafter referred to as a motion vector calculation area) so as to eliminate the adverse effect due to radial motion vectors MV. As a result, the blur amount (camera shake amount) of the imaging device 10 can be efficiently and accurately estimated, which enhances the robustness of alignment processing between frames.

B. Operation of Embodiment

Next, the operation of the above-described embodiment is described.

Figure 4:
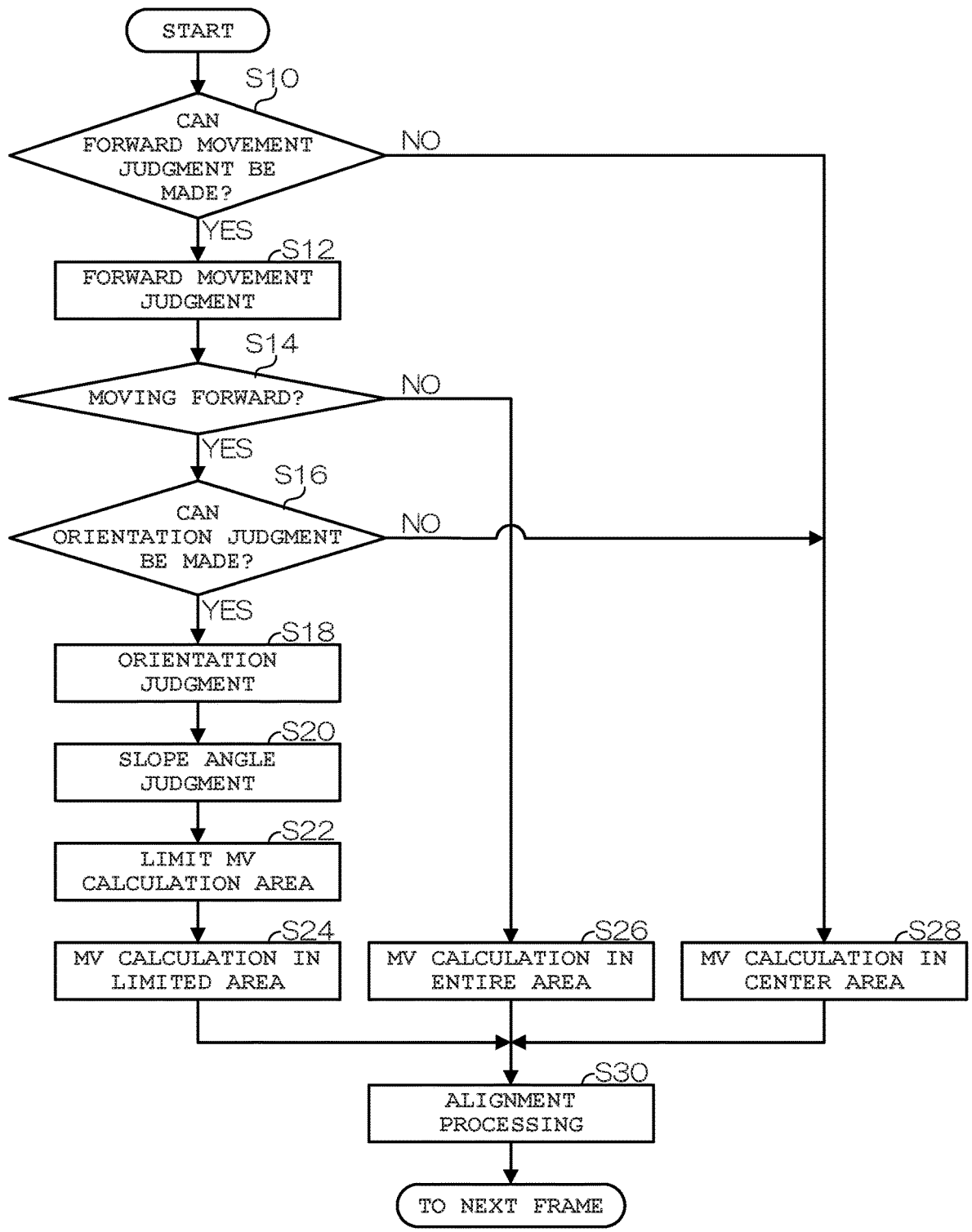
FIG. 4 is a flowchart for describing operations of the imaging device 10 of the present embodiment.
Figure 5A:
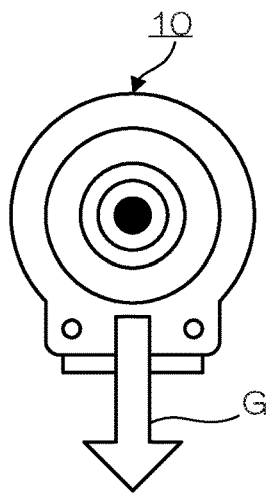
FIG. 5A is a conceptual diagram for describing the orientation of the imaging device 10 according to the present embodiment in which the imaging device 10 has been horizontally held.
Figure 5B:
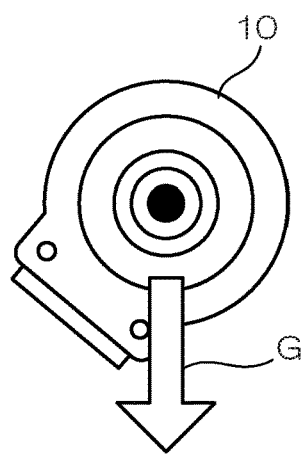
FIG. 5B is another conceptual diagram for describing the orientation of the imaging device 10 according to the present embodiment, in which the imaging device 10 has been obliquely held with respect to the horizontal direction or a movable body mounted with the imaging device 10 is in a tilted state.
Figure 5C:
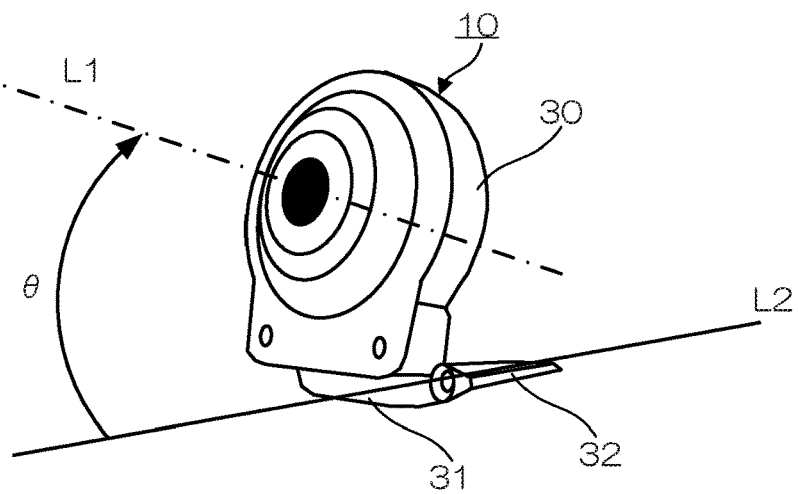
FIG. 5C is still another conceptual diagram for describing the orientation of the imaging device 10 according to the present embodiment in which the optical axis of the imaging device 10 is shown.
Figure 9A:
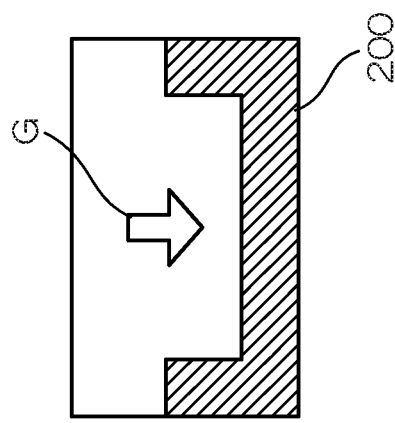
FIG. 9A is a conceptual diagram for describing a motion vector calculating operation according to the present embodiment, in which a MV calculation exception area 200 has been excluded from a motion vector calculation area.
Figure 9B:
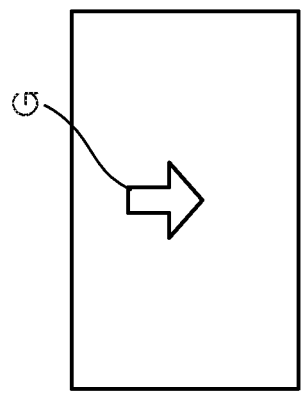
FIG. 9B is a conceptual diagram for describing a motion vector calculating operation according to the present embodiment, in which the entire image area has been taken as a calculation target.
Figure 9C:
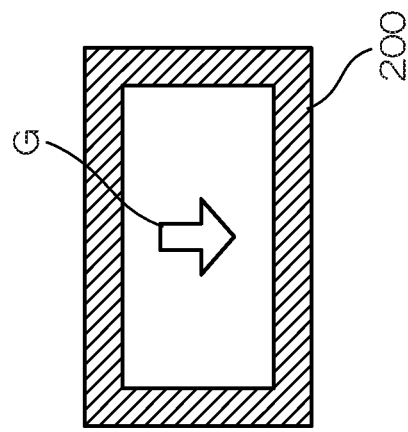
FIG. 9C is a conceptual diagram for describing a motion vector calculating operation according to the present embodiment, in which only a center area has been taken as a calculation target.

FIG. 4 is a flowchart for describing operations of the imaging device 10 of the present embodiment. FIG. 5A to FIG. 5C are conceptual diagrams for describing the orientation of the imaging device 10 according to the present embodiment FIG. 6A to FIG. 6D are conceptual diagrams for describing the position setting of a MV calculation exception area with respect to the gravity direction for the imaging device 10 according to the present embodiment. FIG. 7A to FIG. 7C are conceptual diagrams for describing an operation of adjusting a MV calculation exception area with respect to an elevation angle of the imaging device 10 according to the present embodiment. FIG. 8A to FIG. 8C are conceptual diagrams for describing an operation of adjusting a MV calculation exception area with respect to a movement situation of a movable body according to the present embodiment. FIG. 9A to FIG. 9C are conceptual diagrams for describing a motion vector calculating operation according to the present embodiment.

In the imaging device 10, the CPU 18 judges whether a forward movement judgment can be made (Step S10) When judged that a forward movement judgment can be made (YES at Step S10), the CPU 18 makes a forward movement judgment (Step S12). In the forward movement judgment, the CPU 18 uses various information (gyroscopic information, acceleration, geomagnetism, atmospheric pressure, GPS information, and/or cartographic information) to judge whether or not a movable body mounted with the imaging device 10 is moving forward and the imaging section 14 is capturing images with it being oriented in a forward moving direction. Note that, here, any forward movement judgment method may be used.

Next the CPU 18 judges whether the movable body is moving forward based on the forward movement judgment result (Step S14). When the movable body is moving forward (YES at Step S14), the CPU 18 judges whether a judgment as to the orientation of the imaging device 10 can be made (Step S16). When judged that an orientation judgment can be made (YES at Step S16), the CPU 18 makes a judgment as to the orientation of the imaging device 10 (Step S18).

In the orientation judgment, the CPU 18 uses various information (gyroscopic information, acceleration, and/or geomagnetism) to judge the gravity direction with respect to the imaging device 10 and the elevation angle of the imaging device 10 (or its depression angle, which is a tilt of the imaging direction (the optical axis of the imaging section 14) with respect to the horizontal plane)). For example, a time average of the acceleration sensor may be derived or Kalman filtering may be performed by an acceleration sensor and a gyroscope. Note that, here, any orientation judgment method may be used.

Next, the CPU 18 makes a slope angle judgment for the movement situation of the movable body mounted with the imaging device 10 (Step S20). In the slope angle judgment, the CPU 18 uses various information (GPS, cartographic information, atmospheric pressure, and the like) to judge the slope angle of a road where the movable body is moving forward. Note that, here, any slope angle judgment method may be used.

Next, based on the above-described orientation judgment result and slope angle judgment result, the CPU 18 limits a motion vector calculation area for which a motion vector is calculated (acquired) (Step S22).

Here, the processing of limiting this motion vector calculation area is described. In many imaging scenes, radial motion vectors MV during a forward movement often occur in an image periphery area centering on the gravity direction with respect to the imaging device 10. Also, the size (area) of that area where radial motion vectors occur changes in accordance with the elevation angle (optical axis) of the imaging section 14 with respect to the forward moving direction and the movement situation (slope angle) of a movable body mounted with the imaging device 10.

Accordingly, in the present embodiment, in order to exclude from the motion vector calculation area a MV calculation exception area where radial motion vectors MV may occur, the motion vector calculation area is limited in accordance with the gravity direction, the elevation angle, and the slope angle. That is, the position of the MV calculation exception area to be excluded from the area for which motion vectors MV are calculated is set in accordance with the gravity direction with respect to the imaging device 10, the elevation angle of the imaging device 10, and the slope angle of the movable body, and the size of the MV calculation exception area is adjusted.

For example, as for the gravity direction with respect to the imaging device 10, when the imaging device 10 is horizontally held as shown in FIG. 5A, the gravity direction G with respect to the imaging device 10 is oriented directly downward. Also, when the imaging device 10 is diagonally held or the movable body mounted with the imaging device 10 is tilted as shown in FIG. 5B, the gravity direction G is oriented diagonally downward with respect to the imaging device 10.

Also, the imaging device 10 according to the present embodiment is constituted by the main body housing 30 and the base section 32 coupled to the main body housing 30 via the hinge 31, as described above. Accordingly, the optical axis of the imaging device 10 has an elevation angle θ with respect to the horizontal direction in accordance with the mounting state of the imaging device 10 on the movable body, the movement state of the movable body, and the like, as shown in FIG. 5C.

Next, the setting of the position of the MV calculation exception area and the adjustment of the size of the MV calculation exception area are described. First, the position of the MV calculation exception area is changed in accordance with the gravity direction G, as shown in FIG. 6A to FIG. 6D. Specifically, an area located on the gravity direction G side in captured images is set as a MV calculation exception area.

More specifically, when the gravity direction G coincides with the directly below direction of the imaging device 10, that is, the below direction of each image as shown in FIG. 6A, a MV calculation exception area 200 is set on the lower side of each image. When the gravity direction G coincides with the directly above direction of the imaging device 10, that is, the above direction of each image as shown in FIG. 6B, a MV calculation exception area 200 is set on the upper side of each image.

When the gravity direction G coincides with the right (or left) direction of the imaging device 10, that is, the right (or left) direction of each image as shown in FIG. 6C, a MV calculation exception area 200 is set on the right (or left) side of each image. When the gravity direction G coincides with the diagonally lower left (or lower right) direction of the imaging device 10, that is, the diagonally lower left (or lower right) direction of each image as shown in FIG. 6D, a MV calculation exception area 200 is set on the diagonally lower left (or diagonally lower right) side of each image.

Next, the size (area) of the MV calculation exception area 200 is adjusted in accordance with the elevation angle, as shown in FIG. 7A to FIG. 7C. Here, the case of FIG. 7A where the elevation angle θ is 0° (horizontal) is taken as a reference. When the imaging device 10 is oriented more upward, the periphery is less included in each image, as shown in FIG. 7B. Therefore, the size is adjusted such that the MV calculation exception area 200 is narrowed as the elevation angle θ becomes larger (the elevation angle>0°). Conversely, when the imaging device 10 is oriented more downward, the periphery is more included in each image, as shown in FIG. 7C. Therefore, the size is adjusted such that the MV calculation exception area 200 is widened as the elevation angle θ becomes a larger negative value (the elevation angle<0°, that is, the angle becomes smaller to be a larger depression angle). Note that, although FIG. 7A to FIG. 7C show only the cases where the gravity direction G coincides with the directly below direction, the above-described adjustment is similarly applied in accordance with the orientation of the gravity direction G as shown in FIG. 6A to FIG. 6D.

Then, the size (area) of the MV calculation exception area 200 is adjusted in accordance with the altitude change of the terrain where the movable body is moving, as shown in FIG. 8A to FIG. 8C. Here, the case of FIG. 8A is taken as a reference, in which the terrain where the movable body is moving is flat. When the movable body is ascending an inclined surface as shown in FIG. 8B, even if the elevation angle is 0°, radial motion vectors MV tend to be included in images, and therefore the MV calculation exception area 200 is widened. When the movable body is descending an inclined surface as shown in FIG. 8C, even if the elevation angle is 0°, radial motion vectors MV tend to be less included in images, and therefore the MV calculation exception area 200 is narrowed. As the tilt becomes steeper, the amount of adjustment is increased. Note that, although FIG. 8A to FIG. 8C show only the cases where the gravity direction G coincides with the directly below direction, the above-described adjustment is similarly applied in accordance with the orientation of the gravity direction G as shown in FIG. 6A to FIG. 6D.

Also note that, here, a correspondence between the gravity direction with respect to the imaging device 10, the magnitude of the elevation angle, the movement status of the movable body mounted with the imaging device, the altitude change of the terrain where the movable body is moving, and the MV calculation exception area has been stored in advance in the ROM 12 as a correspondence table.

Also, the optimum band width and the adjustment width of the MV calculation exception area 200 should preferably be set through experiments in accordance with the use purpose of the imaging device 10 and the viewing angle of the lens. Basically, the band width is wider for wider angle lenses.

Then, the CPU 18 calculates a motion vector in the limited motion vector calculation area excluding the MV calculation exception area 200 from the images (Step S24), and uses this motion vector for the processing of estimating a blur amount between the frames. That is, by the MV calculation exception area 200 where radial motion vectors MV tend to occur being excluded from the motion vector calculation area as shown in FIG. 9A, the adverse effect due to radial motion vectors MV can be eliminated, and a blur amount (camera shake amount) between the frames can be more accurately estimated from the motion vector MV between the frames.

At Step S14, if the movable body is not moving forward (NO at Step S14), the CPU 18 takes the entire image area as a calculation target without setting and adjusting a MV calculation exception area 200 as shown in FIG. 9B, and calculates a motion vector MV by also utilizing information regarding the entire peripheral area (Step S26).

At Step S10 or Step S16, when a forward movement judgment cannot be made (NO at Step S10) or an orientation judgment cannot be made (NO at Step S16), the CPU 18 excludes the entire peripheral area where radial motion vectors MV are highly possibly present, as a MV calculation exception area 200, and calculates a motion vector MV by taking only the image center area as a calculation target (Step S28). In this case, beneficial information regarding the peripheral area may not be utilized.

In the method of calculating a motion vector MV herein, for example, a feature point in a plurality of temporally-contiguous frames is extracted from a captured moving image, and a motion vector MV is calculated based on the movement of the feature point between these frames. Note that, in the above-described three motion vector calculation methods, the number of times of arithmetic operation processing should preferably be the same by, for example, the number of motion vectors MV to be searched being set to be the same. Also, here, any motion vector MV calculation method may be used.

In any case, after calculating the above-described motion vector, the CPU 18 estimates a blur amount between the frames from the calculated motion vector MV and, based on this blur amount, performs alignment processing for aligning the feature point between the frames by image deformation processing (Step S30) Note that, here, any frame alignment method may be used. Then, the CPU 18 repeats the above-described processing on the subsequent frames.

According to the above-described embodiment, a MV calculation exception area 200, in which radial motion vectors occur which highly possibly give the adverse effect at the time of motion vector calculation, is set and adjusted in accordance with the orientation of the imaging device 10. As a result of this configuration, flexibility when the imaging device is mounted on a movable body and efficiency when a background motion vector MV is detected can be enhanced.

More specifically, the number of arithmetic operations for calculating a motion vector MV can be reduced, and the adverse effect due to radial motion vectors MV can be efficiently and effectively eliminated. Also, by the elimination of the adverse effect due to radial motion vectors, a blur amount (camera shake amount) between frames can be more accurately estimated from a motion vector MV between the frames. Moreover, by the accurate estimation of a motion vector MV between frames, alignment between the frames can be highly accurately performed.

Also, according to the above-described embodiment the imaging device 10 is mounted on a movable body, and the calculation range of a motion vector MV occurring over the entire image capturing range along with the movement of the movable body is set. As a result of this configuration, flexibility when the imaging device is mounted on a movable body and efficiency when a background motion vector MV is detected can be enhanced.

Moreover, according to the above-described embodiment, the gravity direction G (vertical direction) with respect to the orientation of the imaging device 10 is detected and, based on the gravity direction G (vertical direction), the calculation range of a motion vector MV is changed. As a result of this configuration, the adverse effect due to radial motion vectors MV can be efficiently and effectively eliminated.

Furthermore, according to the above-described embodiment, when the imaging optical axis direction of the imaging section 14 forms an elevation angle with respect to the horizontal direction, the calculation range of a motion vector MV is increased in the gravity direction G (vertical direction). As a result of this configuration, the adverse effect due to radial motion vectors MV can be efficiently and effectively eliminated.

Still further, according to the above-described embodiment, when the imaging optical axis direction of the imaging section 14 forms a depression angle with respect to the horizontal direction, the calculation range of a motion vector MV is decreased in the gravity direction G (vertical direction). As a result of this configuration, the adverse effect due to radial motion vectors MV can be efficiently and effectively eliminated.

Yet still further, according to the above-described embodiment, an altitude change of a terrain where a movable body mounted with the imaging device 10 is moving is detected, and the calculation range of a motion vector MV is set based on the detected change in addition to the orientation of the imaging device 10. As a result of this configuration, the adverse effect due to radial motion vectors MV can be efficiently and effectively eliminated.

Yet still further, according to the above-described embodiment, when images sequentially captured by the imaging section 14 have brightnesses equal to or lower than a predetermined brightness, motion vector calculation is disenabled. As a result of this configuration, the calculation of a motion vector MV is not forcedly performed under an imaging situation where feature point detection is impossible or difficult.

Yet still further, according to the above-described embodiment, based on a motion vector MV calculated from a motion vector calculation range, a blur amount between image frames sequentially captured by the imaging section 14 is estimated and, based on this blur amount, feature point alignment between the frames is performed. As a result of this configuration, more accurate estimation of a blur amount and highly-accurate alignment between frames can be performed.

In the above-described embodiment, a motion vector is calculated in a limited motion vector calculation area excluding a MV calculation exception area 200 in images. However, a configuration may be adopted in which all motion vectors occurring in frames (images) are calculated, and a motion vector in an area excluding a MV calculation exception area 200 in the images is used. As a result of this configuration, processing from image input to vector calculation can be performed as a simple process.

Also, in the above-described embodiment, if images sequentially captured by the imaging section 14 have brightnesses equal to or lower than a predetermined brightness, the CPU 18 cannot extract a feature point in the images. In this case, the motion vector MV calculation processing may be disenabled.

Furthermore, in the above-described embodiment, the present invention has been applied to the operation of the imaging device 10. However, it may be applied to the operation of the remote controller device 20.

In this case, the imaging device 10 transmits captured images and various information (gyroscope/acceleration/geomagnetism) acquired by the sensor 17 to the remote controller device 20. Also, the remote controller device 20 performs the processing described in FIG. 4.

While the present invention has been described with reference to the preferred embodiments, it is intended that the invention be not limited by any of the details of the description therein but includes all the embodiments which fall within the scope of the appended claims.

What is claimed is:

1. A motion vector acquiring device comprising:
a processor that is configured to:
   acquire a motion vector that occurs in an entire imaging range of images inputted by an image capture device along with a movement of the motion vector acquiring device;
   acquire an orientation in a vertical direction of the image capture device; and
   set so as to adjust such that a partial acquisition area of the motion vector to be acquired in the entire imaging range is widened or narrowed in the vertical direction, based on the acquired orientation in the vertical direction of the image capture device.

2. The motion vector acquiring device according to claim 1, wherein the processor sets such that the partial acquisition area of the motion vector to be acquired in the vertical direction is widened, when an imaging optical axis direction of the image capture device forms an elevation angle with respect to a horizontal direction.

3. The motion vector acquiring device according to claim 1, wherein the processor sets such that the partial acquisition area of the motion vector to be acquired in the vertical direction is narrowed, when an imaging optical axis direction of the image capture device forms a depression angle with respect to a horizontal direction.

4. The motion vector acquiring device according to claim 1, wherein the processor is further configured to:
   acquire an altitude change of a terrain where the motion vector acquiring device is moving; and
   set so as to adjust such that the partial acquisition area of the motion vector to be acquired is widened or narrowed in the vertical direction based on the acquired altitude change in addition to the acquired orientation in the vertical direction of the image capture device.

5. The motion vector acquiring device according to claim 1, wherein the processor disenables acquisition of the motion vector, when the images inputted by the image capture device have brightnesses equal to or lower than a predetermined brightness.

6. The motion vector acquiring device according to claim 1, wherein the processor is further configured to:
   estimate a blur amount between frames that are the images inputted by the image capture device, based on the acquired motion vector from the set partial acquisition area of the motion vector; and
   align a feature point between the frames based on the estimated blur amount.

7. The motion vector acquiring device according to claim 1, wherein the motion vector acquiring device is mounted on a movable body.

8. A non-transitory computer-readable storage medium having stored thereon a program that is executable by a computer in a motion vector acquiring device to function as:
   a motion vector acquiring section which acquires a motion vector that occurs in an entire imaging range of images inputted by an image capture device along with a movement of the motion vector acquiring device;
   an orientation acquiring section which acquires an orientation in a vertical direction of the image capture device; and
   a setting section which sets so as to adjust such that a partial acquisition area of the motion vector to be acquired in the entire imaging range is widened or narrowed in the vertical direction, based on the orientation in the vertical direction of the image capture device acquired by the orientation acquiring section.

* * * * *